Patented July 10, 1951

2,559,675

UNITED STATES PATENT OFFICE 2,559,675

VAT DYES OF THE AZO ANTHRAQUINONE SERIES

Herman E. Schroeder, Wilmington, Del., and Joseph Deinet, Glassboro, N. J., assignors to E. I. du Pont de Nemours & Company, Wilmington, Del., a corporation of Delaware No Drawing. Application June 17, 1949, Serial No. 99,880

5 Claims. (Cl. 260—152)

This invention relates to the preparation of new and valuable vat dyes of the anthraquinonethiazole series, and more particularly to new unsymmetrical azobiphenylcarbonylamino-anthraquinone compounds which contain in the molecule an anthraquinone-1,2(N)-thiazole group. The compounds of this invention have the general formula:

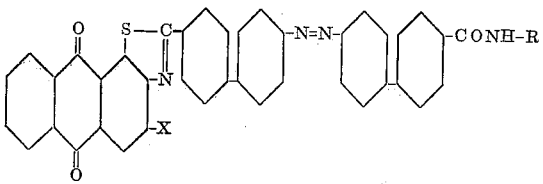

in which X stands for a member of the group consisting of hydrogen and halogen, and R stands for a vattable radical of the group consisting of the unsubstituted anthraquinonyl radical and the anthraquinonyl radicals carrying simple monovalent substituents of the type often introduced into anthraquinone vat dyes, such as halogen, particularly —Cl and —Br, methyl or methoxy groups and simple acylamino groups such as the benzoylamino or the thenoylamino,

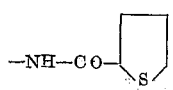

groups.

It has been recognized for many years that, in the dyes of the anthraquinone series, those in the yellow range are generally deficient in their fastness properties, more particularly with regard to fastness to light, although in general the dyes of the anthraquinone vat dye class are considered to have good fastness properties. Where yellow dyes have been found in the anthraquinone series which have good fastness properties, they are usually either dull or weak tinctorially, and therefore the various dyes in the anthraquinone vat dye class must be selected to answer the particular need at hand, balancing the question of fastness, brightness and tinctorial strength of the particular dyes available. In U. S. Patent 2,175,803 a group of symmetrical dianthraquinonediazoles, more particularly imidazoles, 1,2-(N)-thiazoles and 2,1(N)-oxazoles which contain an azo group, are disclosed. These compounds dye vegetable fibers in yellowish shades and are said to exhibit good fastness to chlorine and boiling soap solution, and, in many cases, to light. It has been found, however, that these dyes are deficient in wet fastness, particularly in kier boiling, and in their vat stability. In U. S. Patent 2,228,455 a series of dianthraquinonylimides containing azo groups are disclosed which have relatively good fastness properties, but these dyes have been found to be dull and considerably weaker than the azole types of the first mentioned patent.

It has also been found that the imidethiazoles, such as disclosed in U. S. Patent 2,206,128, exhibit poor light fastness.

It is an object of the present invention to produce new and valuable dyes of the anthraquinone vat dye class which will dye cellulose and related fibers from the usual alkaline hydrosulfite vats in desirable yellow shades and which exhibit improved brightness, tinctorial strength and fastness properties as compared to the dyes of similar shade now available. It is a more specific object of the invention to produce anthraquinone vat dyes which are 4'',4'''-substituted azobiphenyl compounds carrying both an anthraquinone-imino-carbonyl group and an anthraquinone-thiazole group.

The new vat dyes of this invention are prepared by condensing one mol of 4,4'-azobiphenyl-4'',4'''-dicarbonyl chloride with one mol of an aminoanthraquinone and then treating the resulting monoacid chloride with a 1-mercapto-2-aminoanthraquinone or its sodium salt and ring closing, following conventional procedures for the synthesis of thiazoles. The dyes of this invention may be conditioned for dyeing in the usual manner such as by milling or acid pasting with or without bleaching with sodium hypochlorite in the manner customarily employed in the purifying of vat dyes of the anthraquinone series. The colors dye cellulosic materials bright yellow shades showing excellent tinctorial strength and light fastness from an alkaline hydrosulfite vat in which they are stable. Thus, the products of this invention unexpectedly show better wet-fastness and vat stability than the products of U. S. Patent 2,175,803, considerably greater tinctorial strength than the products of U. S. Patent 2,228,455, and light-fastness definitely superior to the products of U. S. Patent 2,206,128.

The preparation of the new dyes of our invention is illustrated by the following examples. Parts, where given, are by weight. The azobiphenyldicarbonyl chloride employed may be obtained from 4,4'-nitrophenylbenzoic acid by reduction with glucose. The acid chloride is readily obtained from the azobiphenyl free diacid by treatment with phosphorous pentachloride or thionyl chloride, preferably in the presence of an organic solvent such as ortho-dichlorobenzene.

Example 1

Three hundred (300) parts of nitrobenzene, 20 parts of 4,4'-azobiphenyl-4'',4'''-dicarbonyl chloride and 15 parts of 1-amino-5-benzoylaminoanthraquinone are slowly heated to 138°–140° C. and manitained for 2½ hours to form the monoacid chloride. The slurry is then cooled to 25° C. One hundred (100) parts of nitrobenzene and 12.5 parts of the sodium salt of 1-mercapto-2-aminoantraquinone are added and the mixture heated to 208°–210° C. and maintained for two hours. It is then cooled to 50° C., filtered, washed with nitrobenzene and alcohol and dried. The product thus obtained may be used directly for dyeing, although for best dyeing results the product is further purified by acid pasting and bleaching with alkaline hypochlorite. The purified products gives a dull violet alkaline hydrosulfite vat from which cotton is dyed in very bright yellow shades of excellent fastness properties and high tinctorial strength. It may be represented by the formula:

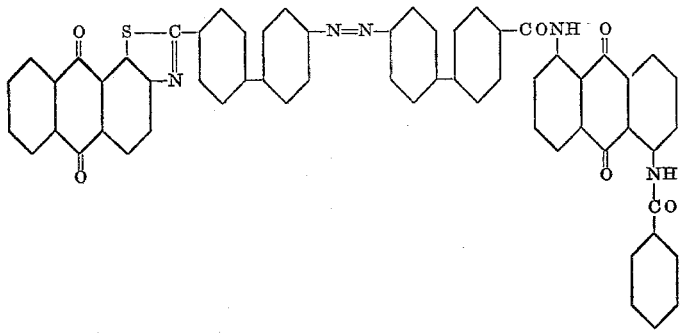

Example 2

Five hundred (500) parts of nitrobenzene, 23 parts of 4,4'-azobiphenyl-4'',4'''-dicarbonyl chloride and 11.5 parts of 1-aminoanthraquinone are slowly heated to 138°–140° C. and maintained for four hours to form the monoacid chloride. After cooling to 25° C., 100 parts of nitrobenzene and 13.8 parts of the sodium salt of 1-mercapto-2-aminoanthraquinone are added and the mixture heated to 210° C. and maintained for two hours. It is then cooled to 50° C., filtered, washed with nitrobenzene and alcohol, and dried. The product then obtained forms a dark yellow powder and may be further purified by acid pasting and alkaline hypochlorite bleaching of the paste. The purified product gives a dull violet vat from which cotton is dyed in bright yellow shades of very good fastness properties and excellent tinctorial strength. The product may be represented by the formula:

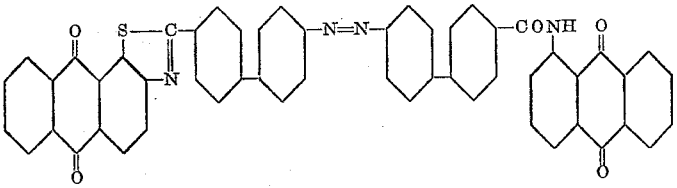

Example 3

Four hundred and twenty-five (425) parts of nitrobenzene, 27 parts of 4,4'-azobiphenyl-4'',4'''-dicarbonyl chloride and 15 parts of 1-chloro-2-aminoanthraquinone are slowly heated to 140° C. and maintained for 6 hours to form the monoacid chloride. The slurry is then cooled to 25° C., 200 parts of nitrobenzene and 17 parts of the sodium salt of 1-mercapto-2-aminoanthraquinone are added, and the mixture is heated to 210° C. and maintained for one hour. It is then cooled to 40° C., filtered, washed with nitrobenzene and alcohol, and dried. The product then obtained forms a dark yellow powder and may be purified by acid pasting and bleaching of the paste. The purified product, which gives a dull violet vat from which cotton is dyed in strong, bright yellow shades, is represented by the formula:

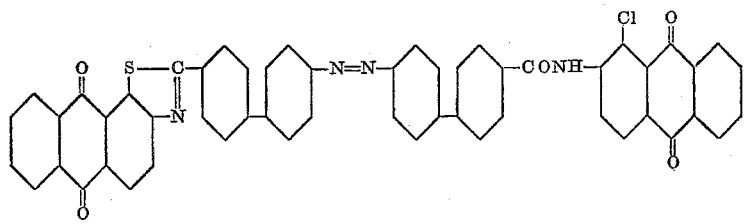

Example 4

Five hundred (500) parts of nitrobenzene, 23 parts of azobiphenyldicarbonyl chloride and 13 parts of 1-chloro-2-aminoanthraquinone are slowly heated to 140° C. and maintained for six hours to form the monoacid chloride. It is then cooled to 25° C., 200 parts of nitrobenzene and 18 parts of the sodium salt of 1-mercapto-2-amino-3-bromoanthraquinone are added and the mixture is heated to 210° C. and maintained for one hour. It is then cooled to 50° C., filtered, washed with nitrobenzene and alcohol, and dried. The product thus obtained forms a dark yellow powder and may be further purified by acid pasting and bleaching. The purified product, which gives a dull violet vat from which cotton is dyed in strong, bright yellow shades, is represented by the formula:

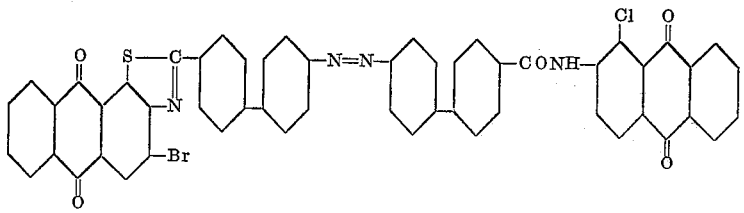

In addition to the colors described in the foregoing examples, other valuable dyes of this series can be produced from, for example, 1-mercapto-2-aminoanthraquinone, 1-mercapto-2-amino-3-chloroanthraquinone or 1-mercapto-2-amino-3-bromoanthraquinone, the monoacid chlorides from azobiphenyldicarbonyl chloride and simple substituted aminoanthraquinones such as: 1-amino-6-chloroanthraquinone, 1-amino-5-methoxyanthraquinone, 1-amino-8-benzoylaminoanthraquinone, 1-amino-4-benzoylaminoanthraquinone, 2-aminoanthraquinone, 1-amino-5,8-dibenzoylaminoanthraquinone, 1-amino-5-(2-thenoylamino)-anthraquinone and 1-amino-2-methylanthraquinone.

It will be obvious that alternative methods of preparation may be employed, such as the condensation of the monoacid chloride with a 1-mercapto-2-aminoanthraquinone followed by ring closure, usually in the presence of acidic catalysts, or treatment of an alpha-monohalogenamide of the formula:

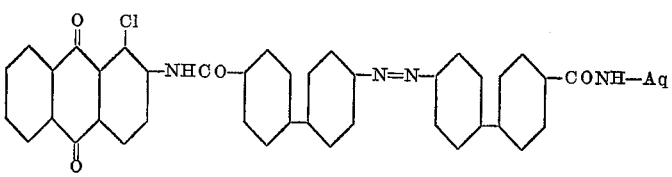

with sodium disulfide at elevated temperatures. The procedure described in the examples is preferred because of its simplicity and the excellent yields obtained.

The dyes of this invention are in general yellow-to-orange powders giving orange-brown solutions in sulfuric acid. They dye cotton in strong, bright yellow shades from alkaline hydrosulfite vats which are dull violet in color. These dyes may be applied by the usual dyeing methods. They dye rapidly and exhaust well, building up to strong shades even when dyed at elevated temperatures such as 80° C. not ordinarily used in dyeing practice.

The condensation of the 4,4'-azobiphenyl-4'',4'''-dicarbonyl chloride with the aminoanthraquinones can ordinarily be effected at temperatures of from 130° to 180° C., while the condensation with the 1-mercapto-2-aminoanthraquinone is preferably effected at temperatures of from 180° to 220° C.

The mono-condensation products of the azobiphenyldicarbonyl chloride with aminoanthraquinones which do not contain the mercapto group are disclosed and claimed in our co-pending application Serial No. 99,871. These materials may be used as intermediates in the present invention for further condensation with the mercaptoaminoanthraquinones.

We claim:
1. The compounds of the formula:

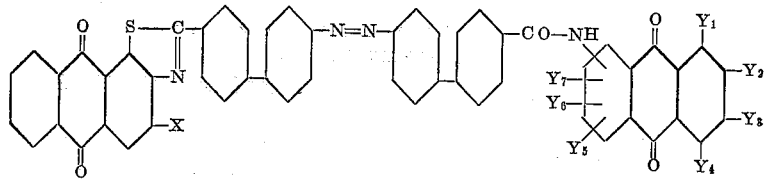

in which X stands for a member of the group consisting of hydrogen, chlorine and bromine and each of $Y_1$, $Y_2$, $Y_3$, $Y_4$, $Y_5$, $Y_6$ and $Y_7$ stands for a member of the group consisting of hydrogen, chlorine, bromine, methyl, methoxy, benzoylamino and thenoylamino groups.

2. The compound of the formula:

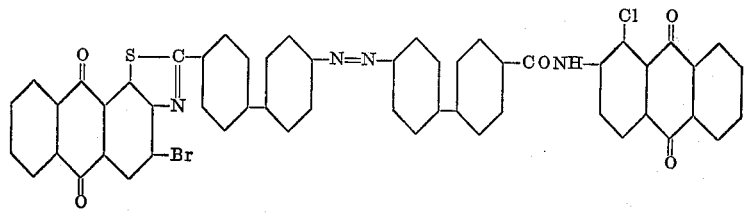

3. The compound of the formula:
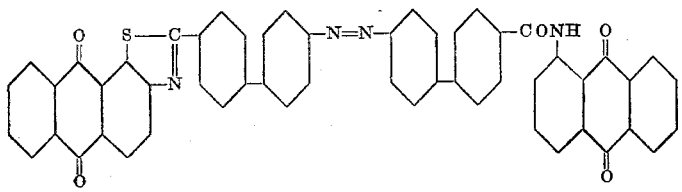
4. The compound of the formula:
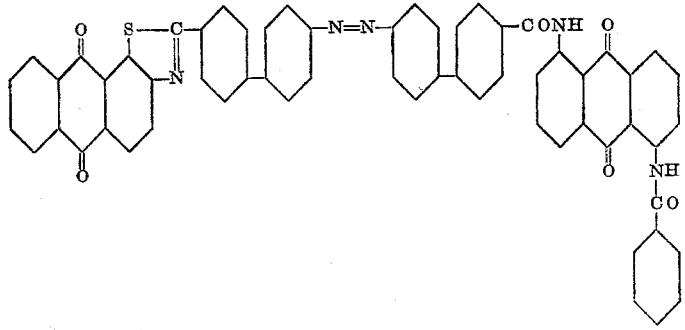
5. The compound of the formula:
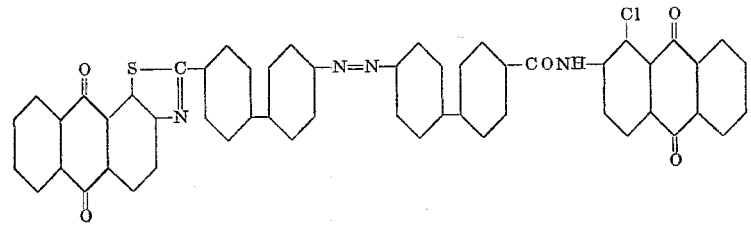
HERMAN E. SCHROEDER.
JOSEPH DEINET.
REFERENCES CITED
The following references are of record in the file of this patent:
UNITED STATES PATENTS
| Number | Name | Date |
|---|---|---|
| 2,175,803 | Honold et al. | Oct. 10, 1939 |
| 2,206,128 | Schlichting | July 2, 1940 |
| 2,228,455 | Honold | Jan. 14, 1941 |
FOREIGN PATENTS
| Number | Country | Date |
|---|---|---|
| 826,768 | France (3rd Addition) | Aug. 12, 1939 |
| 848,018 | France | July 17, 1939 |